Nov. 1, 1949.   H. C. GRAVES, JR   2,486,595
DUAL TIME DELAY FOR CIRCUIT BREAKER TRIP MECHANISM
Original Filed Feb. 17, 1944    3 Sheets-Sheet 2

INVENTOR.
HERBERT C. GRAVES, JR
BY
ATTORNEYS

Nov. 1, 1949.   H. C. GRAVES, JR   2,486,595
DUAL TIME DELAY FOR CIRCUIT BREAKER TRIP MECHANISM
Original Filed Feb. 17, 1944   3 Sheets-Sheet 3
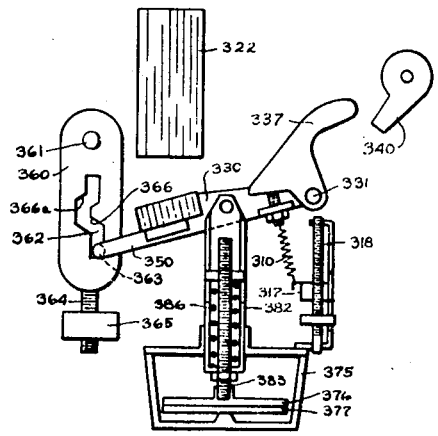
Fig. 3
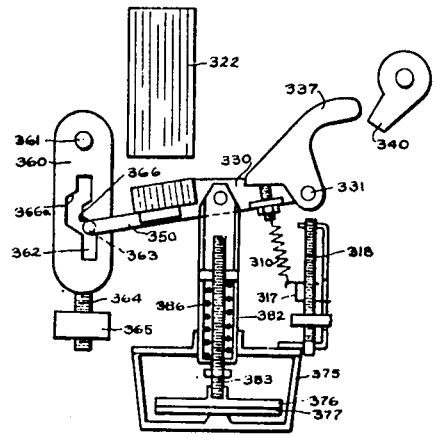
Fig. 4
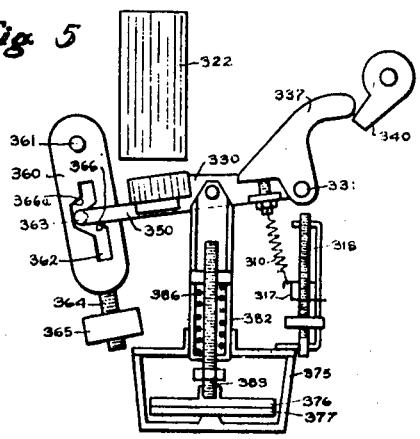
Fig. 5
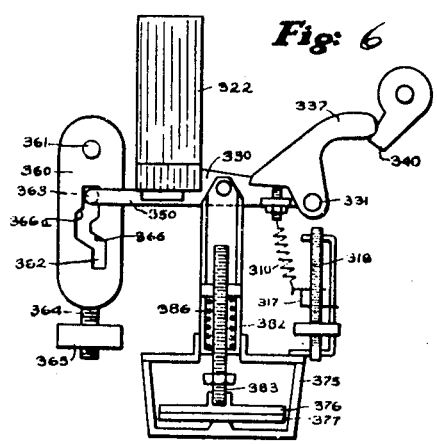
Fig. 6
Fig. 7
INVENTOR.
HERBERT C. GRAVES, Jr.
BY Ostrolenk and Faber
Attorneys Patented Nov. 1, 1949

2,486,595

UNITED STATES PATENT OFFICE 2,486,595

DUAL TIME DELAY FOR CIRCUIT BREAKER TRIP MECHANISM

Herbert C. Graves, Jr., West Chester, Pa., assignor to I-T-E Circuit Breaker Company, Philadelphia, Pa., a corporation of Pennsylvania Original application February 17, 1944, Serial No. 522,725. Divided and this application May 23, 1945, Serial No. 595,457

10 Claims. (Cl. 175—372)

My invention relates to a novel system of circuit breakers arranged for sequential tripping over the entire protective tripping range of the circuit breakers including the short circuit current ranges, and more particularly relates to novel circuit breaker apparatus provided with direct acting overload devices which may be adjusted to secure sequential tripping with respect to other breakers in the system.

In distribution systems within, for instance, a large industrial plant, the power enters the plant through a main circuit breaker to the main distribution switchboard and is there fed out on a number of feeder circuits each protected by a circuit breaker. These feeders may each go to large loads. Some, or all, however, may go to additional distribution switchboards where they are again divided into smaller distribution circuits. Each of these circuits may in turn go to load centers or power panels for distribution of the energy to a multiplicity of loads.

Distribution systems of this type (of which a simplified diagrammatic illustration is hereinafter shown in the figures) are utilized not only in most industrial plants, but also wherever a large quantity of apparatus in a relatively compact unit must be operated from a central power source.

In such distribution systems, the fault current due to fault or short circuit conditions in one of the feeder circuits, or even in one of the load circuits, passes through several breakers in series and may result not merely in a tripping of the circuit breaker protecting that particular load, but in a tripping of each of the circuit breakers back of and in series with that particular circuit breaker back to the source, so that one of the main feeder breakers, or even the main breaker itself, may be tripped and thus disconnect the entire distribution system.

Accordingly, the primary problem to which this invention is directed is the construction and arrangement of such circuit breakers in a distribution system in such a novel manner that high speed selective tripping will occur, and so that the circuit breaker nearest the fault will be operative to clear an overcurrent, fault, or short circuit condition on the particular circuit it is protecting before the circuit breakers between it and the source can complete a tripping operation, and so that each circuit breaker in the system will be protected by the circuit breaker immediately behind it toward the source.

Accordingly, an object of my invention is to provide a novel circuit breaker which is arranged to have characteristic curves for protecting against normal overloads such as currents in motor circuits and short circuit condition.

A further object of my invention is to provide novel direct operating overload apparatus in circuit breakers to secure a novel sequential tripping system.

Still a further object of my invention is to provide restraining or time delay mechanism on the quick trip armature of the overcurrent trip magnet.

These objects will become apparent from the following description and drawings in which:

Figure 3 is a view of a form of momentum absorbing device for utilization in connection with the present invention showing the parts thereof in the unenergized position.

Figures 4, 5 and 7 illustrate the successive steps of the operation of the device of Figure 3 for tripping an overload as the dashpot discs separate giving the time delay.

Figure 6 illustrates the quick trip position under heavy overcurrent conditions.

Figure 1:
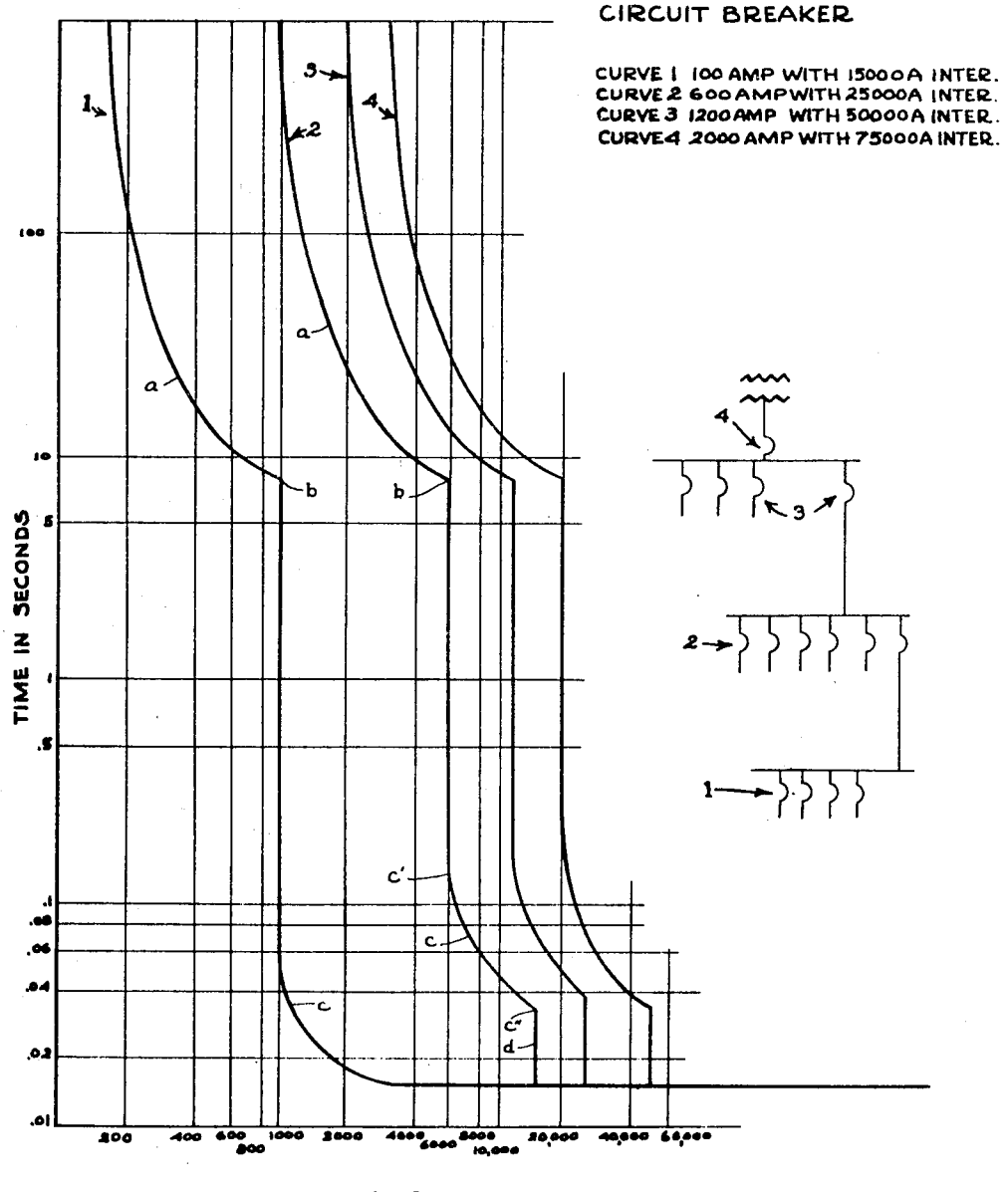
Figure 1 is a schematic diagram of a group of circuit breakers in a typical distribution system together with a graph showing the tripping characteristics of each of the circuit breakers in the group.

Referring now to Figure 1, I have here shown a typical distribution system having a plurality of circuit breakers together with a graph showing the tripping characteristics thereof. In this distribution system, the electrical energy is distributed at a utilization voltage of 440 volts, the various interrupting capacities for each of the breakers are shown in the curves.

The power enters the main plant by the circuit breaker 4, and then passes to a main distribution switchboard whence it is fed out on a number of feeder breakers 3. These feeders may each go to large loads. Some, or all, however, may go to additional distribution switchboards where they are again divided into a plurality of small distribution circuits to which energy is fed out over the circuit breakers 2. Each of these circuits may in turn go to load centers or power panels for distribution of the energy over the circuit breakers 1 to a multiplicity of loads.

Circuit breaker 1 is normally a 100 ampere circuit breaker with time delay up to ten times normal current; after which a quick trip is provided having a very short inverse time delay. Circuit breaker 1 has maximum interrupting capacity of 15,000 amperes.

Thus, following curve 1, it will be seen that at an overcurrent value of a little more than 200 amperes, it will take more than 100 seconds for the circuit breaker to trip. At an overcurrent, however, of 700 amperes, the circuit breaker will trip, should this overcurrent continue for about 8 seconds. However, should the overcurrent value be 1000 amperes, or 10 times the normal rating, then the quick trip comes into play, as shown at curve b or c, and the circuit breaker will trip within .05 second or substantially three cycles.

At greater overcurrent values, the tripping operation will even be faster, as for example at 4,000 amperes in which case tripping occurs in .016 second or substantially one cycle.

At any of these values, breaker No. 1 has sufficient capacity to open the circuit. Accordingly, as shown by portion c of curve 2, circuit breaker No. 2 will not open due to the time delay which sufficiently delays the opening of the circuit breaker No. 2 so that circuit breaker No. 1 opens the circuit and renders the overload device of circuit breaker No. 2 ineffective before it can trip its circuit breaker. Thus, for example, at 4000 amperes, circuit breaker No. 1 opens in .016 second but circuit breaker No. 3 would take 10 seconds to open or 600 cycles.

However, at 15,000 amperes, as above pointed out, the interrupting capacity of circuit breaker 1 is exceeded, and it is necessary that the next circuit breaker open instantaneously. Consequently, the next circuit breaker 2 is provided with an instantaneous trip which comes into operation at 15,000 amperes. This point is indicated at portion d of curve 2.

The other elements of curve 2 correspond in operation to the previously mentioned elements of curve 1. However, it will be seen that even a quick trip operation b of curve 2 occurs with some small time delay over portion c, roughly, of the order of .15 second between c' and c''.

The instantaneous trip at 15,000 amperes is arranged, however, so that even the quick trip time delay is overcome, and the circuit breaker opens in .016 second, and thus in less than a single cycle to protect circuit breaker 1.

Again circuit breaker 2 has, as shown on drawing, a maximum interrupting capacity of 25,000 amperes. Consequently, it is necessary that circuit breaker 3 become instantaneous at this point.

Circuit breaker 3, as shown by curve 3, has an ordinary time delay for ordinary overcurrent surges, a quick trip, and a time delay on the quick trip, as above pointed out in connection with curves 1 and 2. Circuit breaker 3 also has an instantaneous trip d which comes into operation at 25,000 amperes to by-pass even the quick trip time delay and to make the operation of circuit breaker 3 instantaneous at 25,000 amperes, so that it too trips in about .016 second at this current value.

Similarly, since circuit breaker 3 has a maximum interrupting capacity of 50,000 amperes, circuit breaker 4 is arranged to be instantaneous at this value, as will be obvious from the graph of Figure 1; and thus circuit breaker 4 is instantaneous at any value from 50,000 to 75,000 amperes. The 75,000 amperes maximum interrupting capacity of circuit breaker 4 is designed to be greater than any possible current intensity which may occur in the entire distribution system.

Figure 2:
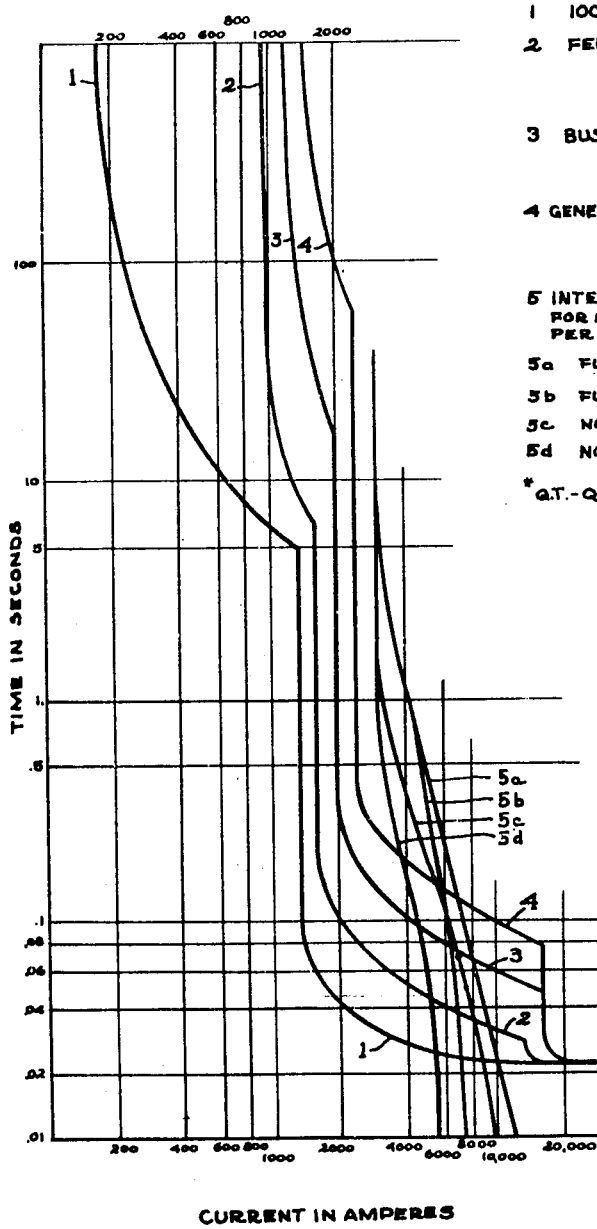
Figure 2 is a schematic diagram of another typical distribution system where, in addition to the problem of the selective tripping of feeder breakers, there are presented the problems which arise from the utilization of two sources of power together with bus tie breaker; this figure also includes a graph showing the tripping characteristics of the breakers in the system.
Figure 2:
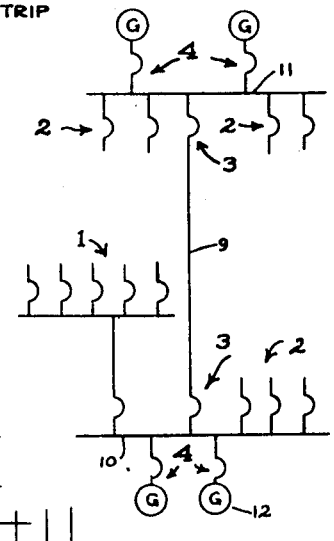

In the case of Figure 2, however, the generators feeding the system are relatively small and can supply only a limited amount of short circuit current. For that reason the quick trip and instantaneous trip of all the breakers in this system may be set for a lower current value than the distribution system shown in Figure 1.

For instance, in Figure 2 while the quick trip of breaker No. 1 is thirteen times normal, the quick trip of breakers No. 2 and 3 and 4 is less than twice normal as compared with ten times normal in the typical distribution system shown in Figure 1.

Likewise the instantaneous trip on breakers No. 2, 3 and 4 is set at approximately 15,000 to 20,000 amperes so as to be well within the short circuit current given by three generators feeding into a fault in the fourth generator.

Since normally the load is fed at each generator station and the bus tie is provided for emergency operation, the bus tie breaker has been selected to have a current capacity equal to one generator only and its overload calibration is set to 80% of one generator capacity.

In Figures 3 to 7, I have shown a device which follows the principles herein described for the purpose of ensuring appropriate sequential operation of circuit breakers in a system which is not cascaded.

In this device, the magnet 322 is arranged to attract the armature 330, the said armature being rotatably mounted on the pin 331. The operation of the armature 330 with respect to the striking member 337 and the latch member 340 is such as to trip the circuit breaker when the armature closes the gap.

The arrangement of the calibrating spring 310, the adjusting nut 317, and the adjusting rod 318 is such as to calibrate the armature. Likewise the arrangement of the dashpot 375, the sucker discs 376 and 377, the rod 383, the compression spring 386, and the sleeve 382 is such that when the armature is attracted by sufficient force spring 386 is compressed and the armature is free of the time delay provided by dashpot 375.

The quick trip time delay feature in this case includes the oscillating weight 360. The armature 330 is provided at the end opposite the pin 331 with an extension 350 carrying a pin 363 which passes through a slot 362 in the weight 360. The weight 360 is rotatably suspended from the pin 361 and may swing back and forth thereon. The weight 360 is also provided with adjustable means to increase the mass thereof and also to vary the natural period of oscillation thereof with respect to the pin 361. This means comprises a threaded extension 364 from the lower end of the weight 360 with an additional weight 365 mounted on the extension 364 in threaded engagement therewith and movable by rotation thereof along the extension 364 for the purpose immediately above mentioned. Change of this mass as will now be understood will change the time delay.

Figure 3 shows the condition of all of the parts when deenergized or when the circuit breaker in which the tripping device is mounted carries only the normal current for which it is rated.

Figures 4, 5 and 6 show successive phases in the quick trip device where the compression spring 386 in the ordinary time delay device is compressed by reason of the excessive current result in increased pull by the magnet on the armature. In these successive phases in Figures 4, 5 and 6, it will be seen that the weight 360 and its associated adjustably positioned mass 365 is successively oscillated to a plurality of positions during the course of the movement of the armature from the position of Figure 3 to the full trip position of Figure 6.

In Figure 7 the operation of the device for tripping on overload after the dashpot discs in the dashpot 375 have separated is shown. In this case the relatively slow movement of the armature is not to any appreciable extent interfered with in any way by the quick trip time delay effected by the weight 360. Thus, where the circuit breaker is subjected to a slightly excessive load of substantial duration (this load not being sufficient to result in a compression of the spring 386) the movement of the armature from the position of Figure 3 to the position of Figure 7 will depend on the separation of the discs 376 and 377 and the time required for the breaking of the oil film between these discs will determine the time delay in the case of such relatively small overload.

In the case of an overload requiring a quick trip, the time delay given by the dashpot 375 is mechanically by-passed by the compression of the spring 386; the quick trip is thus permitted to occur, and a short time delay by reason of the necessary oscillation of the weight 360 is obtained.

As the armature rises from the position of Figure 3 to the position of Figure 4 (with the spring 386 being compressed) the pin 363 on the armature strikes against the surface 366 on the interior of the slot 362. This results in a momentary halt for a relatively minute period in the movement of the armature while the weight 360 is swung from the position shown in Figure 4 to the position shown in Figure 5.

As the armature 330 continues to rise through the position shown in Figure 5, the pin now strikes against the surface 366a in the slot 362. This again results in a momentary halt for a relatively minute period of the movement of the armature 330 while the weight is swung back from the position shown in Figure 5 to the position shown in Figure 6 so that the armature may continue to move upwardly in the slot 362 as shown in Figure 6 to effect a full trip. The time delay thus obtained in the operation of the quick trip is that which is necessary to permit this vibration or oscillation of the weight 360 to permit the pin 363 on the armature 330 to move upwardly in the slot 362. This time, as above pointed out, is of the order of 1 to 12 cycles.

The adjustably positioned mass 365 is arranged and used so that the effective mass of weight 360 may be increased and also so that it may be adjusted to a position where no possible movement of the armature will conform to the natural period of vibration of the weight 360.

In the foregoing I have described my invention and the method achieved thereby in connection only with specific preferred embodiments and in connection with specific operative examples of the system and the method. Many variations and modifications of the physical embodiments of my invention and of the systems and methods which are the essence thereof should now be obvious to those skilled in the art. Accordingly, I prefer to be bound not by the specific disclosures herein, but only by the appended claims.

This application is a division of my application Ser. No. 522,725, filed February 17, 1944, now Patent No. 2,439,165, issued April 6, 1948, and a continuation-in-part of my application, Ser. No. 488,841, filed May 28, 1943.

I claim:

1. In combination, an armature mounted for predetermined movement, a magnet for effecting movement of said armature in one direction, means for retarding movement of said armature in said direction comprising a time delay comprising an oscillable weight having a slot comprising a plurality of connected slot sections, adjacent slot sections being at an angle to each other, a portion of said armature extending into said slot, an adjustable extension comprising a weight secured to said oscillable weight for changing the natural period of oscillations of said weight, said oscillable weight oscillating as said armature moves in said successive slot sections toward the pole face of the magnet, said oscillable weight effecting a time delay in the rate of movement of said armature in response to the energization of said magnet by a predetermined current value flowing therein.

2. Means for retarding movement in one direction of the armature of a time delay electromagnetic device upon a predetermined energization thereof comprising a time delay comprising an oscillable weight having a slot comprising a plurality of connected slot sections, adjacent slot sections being at an angle to each other, a portion of said armature extending into said slot, an adjustable extension comprising a weight secured to said oscillable weight for changing the natural period of oscillations of said weight, said oscillable weight oscillating as said armature moves in said successive slot sections toward the pole face of the magnet, said oscillable weight effecting a time delay in the rate of movement of said armature in response to the energization of said magnet by a predetermined current value flowing therein, and a further time delay mechanism, a spring connection from said armature to said further time delay mechanism for permitting movement of said armature without movement of said further time delay mechanism in response to predetermined currents flowing in said magnet, said further time delay mechanism being operable to effect a time delay in the operation of said armature in response to predetermined currents flowing in said magnet.

3. In a time delay mechanism for a circuit breaker trip device including a pivoted armature movable in one direction in response to variable forces, a spring biasing said armature against movement, a time delay comprising a pivoted oscillable weight having a slot comprising a plurality of connected slot sections, adjacent slot sections being at an angle to each other, a portion of said armature extending into said slot, an adjustable extension comprising a weight secured to said oscillable weight for changing the natural period of oscillations of said weight, said oscillable weight oscillating as said armature moves in said successive slot sections toward the pole face of the magnet, said oscillable weight effecting a time delay in the rate of movement of said armature in response to a predetermined force.

4. In a time delay mechanism for a circuit breaker trip device including a pivoted armature movable in one direction in response to variable forces, a spring biasing said armature against movement, a time delay comprising a pivoted oscillable weight having a slot comprising a plurality of connected slot sections, adjacent slot sections being at an angle to each other, a portion of said armature extending into said slot, an adjustable extension comprising a weight secured to said oscillable weight for changing the natural period of oscillations of said weight, said oscillable weight oscillating as said armature moves in said successive slot sections toward the pole face of the magnet, said oscillable weight effecting a time delay in the rate of movement of said armature in response to a predetermined force, and a further time delay mechanism, a spring connection from said armature to said further time delay mechanism for permitting movement of said armature without movement of said further time delay mechanism in response to predetermined currents flowing in said magnet, said further time delay mechanism being operable to effect a time delay in the operation of said armature in response to predetermined currents flowing in said magnet.

5. In a time delay mechanism for a circuit breaker trip device including an armature arranged for movement in one direction in response to variable forces, a first time delay means, a spring connecting said time delay means to said armature, said spring having sufficient flexibility to permit movement of the armature without corresponding movement of the first time delay means when a predetermined force is applied to the armature and said spring having sufficient rigidity to delay movement of the armature by said first time delay means when less than a predetermined force is applied to the armature, a second time delay connected to said armature, said second time delay comprising a rotatably mounted mass, a member connected to the armature, said mass having a slot therein, said slot comprising a plurality of connected slot sections, adjacent slot sections being at an angle to each other, said member engaging said slot and swinging said mass as said armature moves toward said magnet.

6. In a time delay mechanism for a circuit breaker trip device including an armature arranged for movement in response to variable forces, a dashpot, a spring connecting said dashpot to said armature, said spring being effective to maintain a rigid mechanical connection between the dashpot and armature to effect movement of said dashpot by said armature when the armature is attracted with less than a predetermined force and said spring being ineffective to maintain said rigid connection when the armature is attracted to the magnet with more than said predetermined force to permit armature movement free of said dashpot, a second time delay connected to said armature, said second time delay comprising a rotatably mounted mass, a member connected to said armature, said mass having a slot therein, said slot comprising a plurality of connected slot sections, adjacent slot sections being at an angle to each other, said member engaging said slot and swinging said mass as said armature moves toward said magnet.

7. In a time delay mechanism for a circuit breaker trip device including an armature arranged for movement in one direction in response to variable forces, a time delay connected to said armature, said time delay comprising a pivoted rotatably mounted mass, a member connected to said armature, said mass having a slot therein, said slot comprising a plurality of connected slot sections, adjacent slot sections being at an angle to each other, said slot extending substantially along a radius from the pivot of said rotatably mounted mass, at least one of said slot sections extending at an angle to said radius, said member engaging said slot and swinging said mass as said armature moves toward said magnet.

8. In a time delay mechanism for a circuit breaker trip device including an armature arranged for movement in one direction in response to variable forces, a time delay connected to said armature, said time delay comprising a pivoted rotatably mounted mass, a member connected to said armature, said mass having a slot therein, said slot comprising a plurality of connected slot sections, adjacent slot sections being at an angle to each other, said slot extending substantially along a radius from the pivot of said rotatably mounted mass, the first slot section adjacent said pivot extending along said radius, the second slot section connected thereto extending at an angle to said radius, the third slot section connected to said second slot section extending along a line parallel to said radius, said member engaging said slot and swinging said mass as said armature moves toward said magnet.

9. In a time delay mechanism for a circuit breaker trip device including an armature arranged for movement in one direction in response to variable forces, a time delay, a spring connecting said time delay means to said armature, said time delay comprising a pivoted rotatably mounted mass, a member connected to said armature, said mass having a slot therein, said slot comprising a plurality of connected slot sections, adjacent slot sections being at an angle to each other, said slot extending substantially along a radius from the pivot of said rotatably mounted mass, the first slot section adjacent said pivot extending along said radius, the second slot section connected thereto extending at an angle to said radius, the third slot section connected to said second slot section extending along a line parallel to said radius, the fourth slot section connected to said third slot section extending at an angle to said radius opposite to the angle of said second slot section and the fifth slot section connected to said fourth slot section extending along said radius, said member engaging said slot and swinging said mass as said armature moves toward said magnet.

10. In a time delay mechanism for a circuit breaker trip device including an armature arranged for movement in one direction in response to variable forces, a time delay means connected to said armature, said time delay means comprising a pivoted rotatably mounted mass, an arm, movement of said arm causing movement of said mass, and means connecting said arm to said armature for movement therewith, said mass having a zig-zag slot therein, said arm engaging said slot and swinging said mass as said armature moves toward said magnet.

HERBERT C. GRAVES, Jr.

REFERENCES CITED

The following references are of record in the file of this patent:

UNITED STATES PATENTS

| Number | Name | Date |
| --- | --- | --- |
| 1,123,288 | Hellmund | Jan. 5, 1915 |
| 2,340,973 | May et al. | Feb. 8, 1944 |
| 2,393,736 | Bennett et al. | Jan. 29, 1946 |